US008787692B1

(12) United States Patent  (10) Patent No.: US 8,787,692 B1
Han et al.  (45) Date of Patent: *Jul. 22, 2014

(54) IMAGE COMPRESSION USING EXEMPLAR DICTIONARY BASED ON HIERARCHICAL CLUSTERING

(71) Applicant: Google Inc., Mountain View, CA (US)

(72) Inventors: Mei Han, Palo Alto, CA (US); Michele Covell, Palo Alto, CA (US); Saurabh Mathur, Sunnyvale, CA (US); Shumeet Baluja, Santa Clara, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,965

(22) Filed: Jul. 19, 2013

Related U.S. Application Data

(63) Continuation of application No. 13/083,493, filed on Apr. 8, 2011, now Pat. No. 8,515,193.

(51) Int. Cl.
*G06K 9/36* (2006.01)
(52) U.S. Cl.
USPC .......................................................... 382/238
(58) Field of Classification Search
USPC ......... 382/190, 225, 226, 227, 232, 233, 235, 382/236, 238, 239, 240, 245, 248, 250; 341/50, 51, 106; 348/384.1, 390.1, 348/394.1, 395.1, 400.1, 409.1, 414.1, 348/415.1, 417.1, 418.1, 420.1, 421.1, 348/430.1, 431.1; 375/240.01, 240.12, 375/240.14, 240.15, 240.16, 240.18, 375/240.19, 240.2, 240.24; 380/217; 710/68
See application file for complete search history.

(56) References Cited

U.S. PATENT DOCUMENTS

| 6,115,035 | A   |    9/2000 | Compton et al. |         |
|-----------|-----|-----------|----------------|---------|
| 6,571,016 | B1 *|    5/2003 | Mehrotra et al.| 382/236 |
| 6,574,279 | B1  |    6/2003 | Vetro et al.   |         |
| 6,678,417 | B1  |    1/2004 | Baumgartner et al. |     |
| 7,162,091 | B2 *|    1/2007 | Wang et al.    | 382/233 |
| 7,181,072 | B2 *|    2/2007 | Wang et al.    | 382/239 |
| 7,836,050 | B2  |   11/2010 | Jing et al.    |         |
| 7,961,922 | B2 *|    6/2011 | Spence et al.  | 382/128 |
| 8,363,953 | B2 *|    1/2013 | Kameyama       | 382/195 |
| 8,515,193 | B1  |    8/2013 | Han et al.     |         |
| 8,532,394 | B2 *|    9/2013 | Kameyama       | 382/195 |
| 2003/0123737 | A1 |  7/2003 | Mojsilovic et al. |       |
| 2004/0190633 | A1 |  9/2004 | Ali et al.     |         |
| 2006/0093188 | A1 |  5/2006 | Blake et al.   |         |
| 2007/0074251 | A1 |  3/2007 | Oguz et al.    |         |
| 2008/0092159 | A1 |  4/2008 | Dmitriev et al. |        |
| 2008/0127270 | A1 |  5/2008 | Shipman et al. |         |
| 2009/0022472 | A1 |  1/2009 | Bronstein et al. |       |

(Continued)

*Primary Examiner* — Jose Couso
(74) *Attorney, Agent, or Firm* — Fish & Richardson P.C.

(57) ABSTRACT

An exemplar dictionary is built from example image blocks for determining predictor blocks for encoding and decoding images. The exemplar dictionary comprises a hierarchical organization of example image blocks. The hierarchical organization of image blocks is obtained by clustering a set of example image blocks, for example, based on k-means clustering. Performance of clustering is improved by transforming feature vectors representing the image blocks to fewer dimensions. Principal component analysis is used for determining feature vectors with fewer dimensions. The clustering performed at higher levels of the hierarchy uses fewer dimensions of feature vectors compared to lower levels of hierarchy. Performance of clustering is improved by processing only a sample of the image blocks of a cluster. The clustering performed at higher levels of the hierarchy uses lower sampling rates as compared to lower levels of hierarchy.

28 Claims, 7 Drawing Sheets

(56) References Cited

U.S. PATENT DOCUMENTS

| | | |
|---|---|---|
| 2009/0265389 A1 | 10/2009 | Kalpaxis |
| 2010/0086062 A1 | 4/2010 | Pace |
| 2010/0125871 A1 | 5/2010 | Liao et al. |
| 2011/0218997 A1 | 9/2011 | Boiman et al. |
| 2011/0246440 A1 | 10/2011 | Kocks et al. |
| 2012/0099785 A1 | 4/2012 | Hill et al. |

* cited by examiner

IMAGE COMPRESSION USING EXEMPLAR DICTIONARY BASED ON HIERARCHICAL CLUSTERING

FIELD OF THE INVENTION

This invention relates to computer-implemented compression and decompression of digital content, including image and video content.

BACKGROUND

Compression, also called "encoding," is used to represent digital information using a minimum amount of bits. Compression allows efficient storage or transmission of digital information. Examples of digital information that is often compressed include images and videos. Certain types of digital content such as images have statistical properties that can be exploited during compression, thereby allowing specialized compression techniques that are better than general purpose binary data compression techniques. Videos, being sequences of images, also have the same exploitable properties.

Lossy compression techniques are commonly used to compress images. Such lossy techniques sacrifice finer details of the image in order to obtain a greater rate of compression. When a lossy-compressed image is decompressed, or decoded, the resulting image lacks the fine details that were sacrificed. However, often times the lost details are unnoticeable to human viewers.

Several compression standards have been developed by industry groups such as the Moving Pictures Experts Group (MPEG) in order to encode various types of content. For example, the MPEG-1 standard is used for compact disk read-only memory (CD-ROM) video applications including video CDs, the MPEG-2 standard is used for digital video disks (DVD) and standard definition (SD) high-definition (HD) televisions, and the MPEG-4 standard, including H.264/MPEG4-AVC, is used for multimedia and web applications. Similarly, standards developed by the Joint Photographic Experts Group (JPEG) are used for lossy compression of still images. These standards work well but can be improved.

SUMMARY

The above and other issues are addressed by a computer-implemented method, computer system, and computer program product for building an exemplar dictionary for identifying predictor blocks for encoding images and for encoding an image using the exemplar dictionary. Embodiments of the method for building the exemplar dictionary comprise identifying a set of exemplars for building the exemplar dictionary. Each exemplar comprises at least one image. Hierarchical clustering of the identified exemplars is performed to generate a plurality of clusters arranged as a hierarchy. The exemplars are filtered to generate clusters at each level of hierarchy. The filtering performed for higher levels of hierarchy generates less information per exemplar compared to the filtering performed for lower levels of hierarchy. The filtering can be performed by sampling the set of exemplars or by reducing the dimensions of feature vectors representing the exemplars. The exemplar dictionary comprising the information describing the hierarchy of clusters is stored. The exemplar dictionary is used to identify predictor blocks for encoding images.

Embodiments of the computer system for building an exemplar dictionary comprise a computer processor and a computer-readable storage medium storing computer program modules. The computer program modules comprise a dictionary builder module, a clustering module, and one or more of a sampling module and a dimension reduction module. The dictionary builder module is configured to identify a set of exemplars for building the dictionary. The clustering module is configured to perform hierarchical clustering of the set of exemplars to generate a plurality of clusters arranged as a hierarchy. The exemplars from the set of exemplars are filtered to generate clusters at each level of hierarchy. The filtering performed for higher levels of hierarchy generates less information per exemplar compared to the filtering performed for lower levels of hierarchy. The sampling module is configured to perform filtering by generating a sample subset of exemplars. The dimension reduction module is configured to perform filtering by reducing dimensions of feature vectors representing the exemplars. The dictionary builder module is further configured to store the exemplar dictionary comprising information describing the hierarchy of clusters. The exemplar dictionary is used to identify predictor blocks for encoding images.

Embodiments of the computer program product for building an exemplar dictionary have a computer-readable storage medium storing computer-executable code for compressing a digital image. The computer-executable code comprises a dictionary builder module, a clustering module, and one or more of a sampling module and a dimension reduction module. The dictionary builder module is configured to identify a set of exemplars for building the dictionary. The clustering module is configured to perform hierarchical clustering of the set of exemplars to generate a plurality of clusters arranged as a hierarchy. The exemplars from the set of exemplars are filtered to generate clusters at each level of hierarchy. The filtering performed for higher levels of hierarchy generates less information per exemplar compared to the filtering performed for lower levels of hierarchy. The sampling module is configured to perform filtering by generating a sample subset of exemplars. The dimension reduction module is configured to perform filtering by reducing dimensions of feature vectors representing the exemplars. The dictionary builder module is further configured to store the exemplar dictionary comprising information describing the hierarchy of clusters. The exemplar dictionary is used to identify predictor blocks for encoding images.

Embodiments for a method for encoding an image using the exemplar dictionary comprise selecting a target block from an image. The exemplar dictionary is organized as a hierarchy of clusters comprising multiple levels of hierarchy, each level of the hierarchy associated with a set of dimensions of features vectors. A predictor block matching the target block is selected from the exemplar dictionary. The searching is performed by executing the following steps at each level of hierarchy. The target block is represented as a feature vector using the set of dimensions associated with the level. A matching cluster is determined for the target block. If the matching cluster is determined to be at the leaf level, an exemplar that matches a selection criteria is selected from the matching cluster and used as the predictor block. The target block is encoded using the predictor block and the encoded image having the encoded target block is stored.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

System Environment and Architectural Overview

Figure 1:
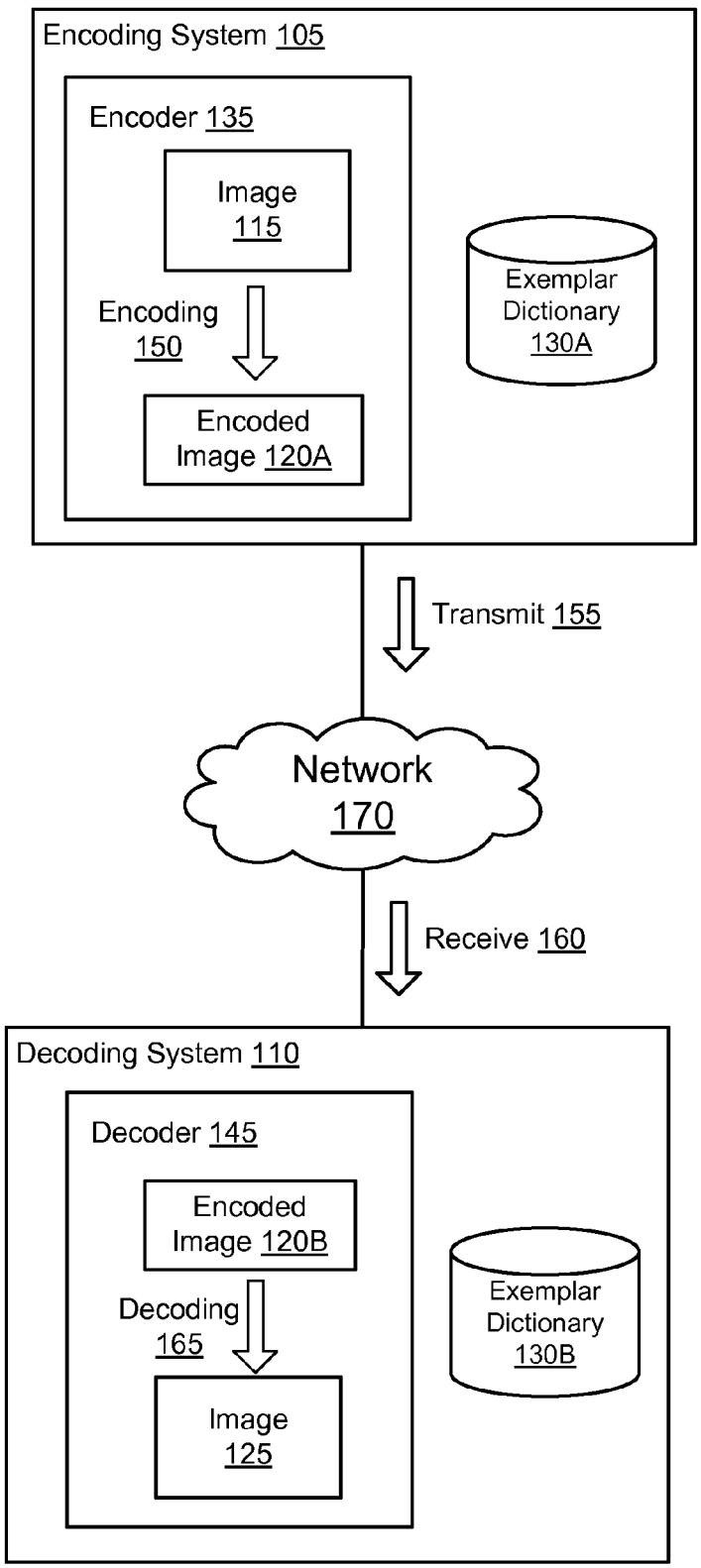
FIG. 1 is a high-level block diagram of a computing environment illustrating the steps of encoding and decoding an image according to one embodiment of the present invention.

FIG. 1 is a high-level block diagram of a computing environment illustrating the steps of encoding and decoding an image according to one embodiment of the present invention. As shown, the computing environment 100 includes an encoding system 105 and a decoding system 110 connected through a network 170. In one embodiment, the encoding system 105 or the decoding system 110 can be a conventional computer system executing, for example, a Microsoft Windows-compatible operating system (OS), Apple OS X, and/or a Linux distribution. In another embodiment, the encoding system 105 or the decoding system 110 can be a device having computer functionality, such as a personal digital assistant (PDA), mobile telephone, video game system, etc.

FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

The network 170 enables communications between the encoding system 105 and the decoding system 110. In one embodiment, the network 170 uses standard communications technologies and/or protocols. Thus, the network 170 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 170 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 170 can also include links to other networks such as the Internet.

The encoding system 105 comprises an encoder module 135 and an exemplar dictionary 130A. The encoder module 135 encodes 150 an original image 115 to generate an encoded image 120A. The original image 115 can be, for example, a still image or an image contained in a frame of video. The encoding 150 compresses the original image 115 to produce an encoded, or "compressed," image 120A that represents the original image using less information (e.g., fewer bits) compared to the original image 115. The encoded image 120A thus provides for efficient storage of the information in the original image 115.

In one embodiment, the encoding process 150 used by the encoding system 105 uses a block-based technique. In this technique, the image is divided into a set of blocks, such as blocks of 16×16 pixels. A block in the sequence to be encoded, called a "target block," is encoded by describing the differences between the target block and a block from an exemplar image, called the "predictor block." In other words, the predictor block is used to "predict" the target block, and the result of this prediction is encoded. The predictor block is also referred to as the "predictor" or the "reference block" herein.

The exemplar dictionary 130 is a store of exemplar images, each exemplar image comprising one or more image blocks that can be used as predictors for encoding target blocks in an image 115. The exemplar dictionary 130 may comprise a large number of exemplar images, for example, several million exemplar images. As a result, searching through the exemplar dictionary using conventional methods can be a slow process. Embodiments of the present invention organize the exemplar dictionary 130 using structures that allow for efficient search of a predictor block for encoding a target block.

The exemplar dictionary 130 can be built either by the encoding system 105, by the decoding system 110, or by any other computing system and transmitted to the encoding system 105 or the decoding system 110 as necessary. Transmission of the exemplar dictionary 130 can be a slow process due to the size of the information stored in the exemplar dictionary 130. The exemplar dictionary 130 can be transmitted either electronically or by physical transmission of a storage device storing the exemplar dictionary 130. The exemplar images stored in the exemplar dictionary 130 can be obtained from various sources, for example, stores of preexisting images in an enterprise.

The encoded image 120A allows for efficient storage as well as efficient transmission 155 of the information in the original image 115 over the network 170. This transmission scenario can occur, for example, when a user is using the decoding system 110 to browse the web and download images from web sites. The images can be still images, frames of a video arranged in a sequence and stored in a discrete file, and/or frames of video streamed to the decoding system 110.

The encoded image 120A can be transmitted 155 by the encoding system 105 over the network 170 and received 160 by the decoding system 110. The encoded image 120B received by the decoding system 110 represents the copy of encoded image 120A held by computer system 110A. The decoding system 110 comprises an decoder module 145 and an exemplar dictionary 130B. The decoder module 145 can decode 165 the encoded image 120B to obtain a replica of the original image or an approximation of the original image, the "decompressed" image 125. The decoder module 145 uses the exemplar dictionary 130B for identifying predictor blocks used for decoding the blocks of the encoded image 120B. The encoding/decoding techniques described herein can also be used in non-networked environments.

Figure 2:
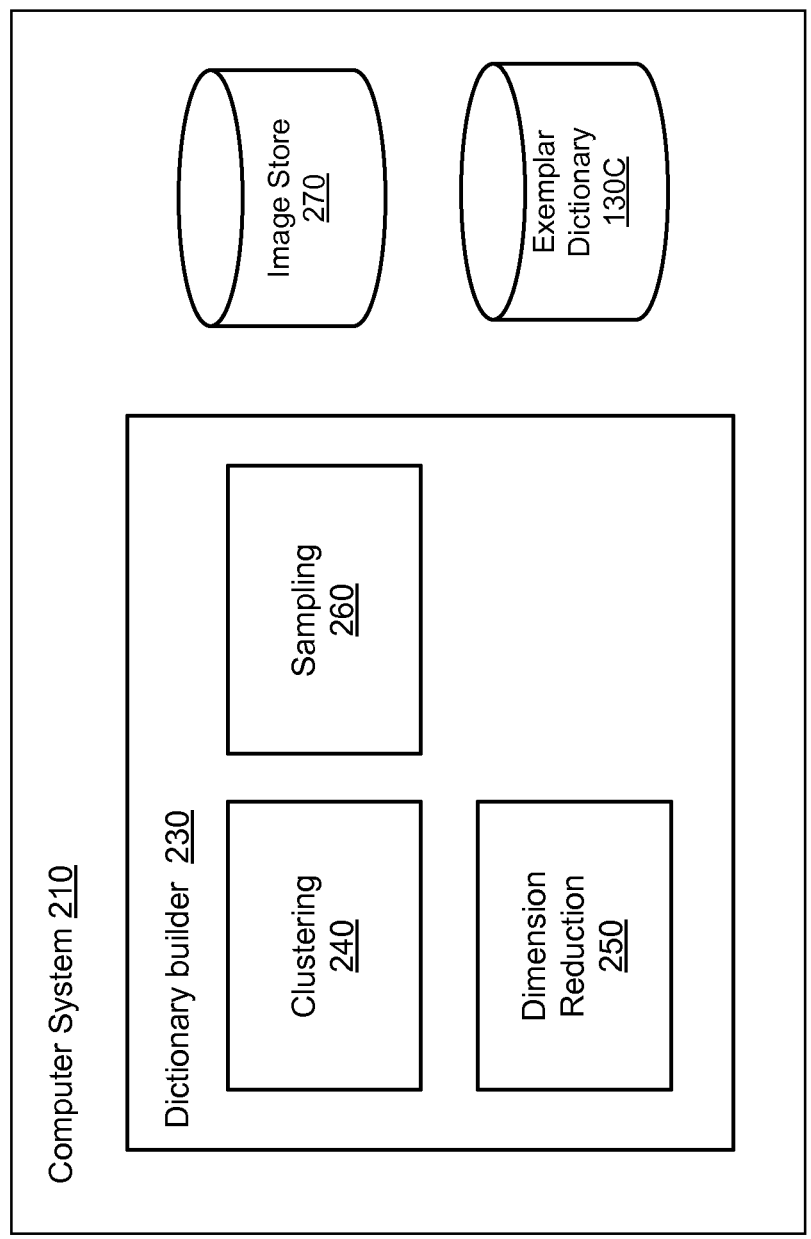
FIG. 2 is a high-level block diagram illustrating modules within a computer system for building an exemplar dictionary according to one embodiment of the present invention.

FIG. 2 is a high-level block diagram illustrating modules within a computer system 210 for building an exemplar dictionary 130 according to one embodiment of the invention. The computer system 210 comprises a dictionary builder module 230, an image store 270, and an exemplar dictionary 130C. Some embodiments of the computer system 210 have different and/or other modules than the ones described herein, and the functions can be distributed among the modules in a different manner than is described here. For example, the computer system 210 might also include other modules shown in the encoding system 105 or the decoding system 110.

The image store 270 stores a set of exemplar images. The exemplar images can show different types of entities such as buildings, people, animals, birds, trees, natural scenery or combinations of these. The exemplar images may be collected from different sources, for example, images uploaded by users of an image storage system, images obtained by professional stock photography, image galleries, and the like. Each exemplar image may comprise one or more image blocks. An exemplar image can comprise video frames.

The dictionary builder module 230 builds the exemplar dictionary 130 based on the images in the image store 270. In one embodiment, the dictionary builder module 230 organizes the blocks of images from the image store 270 in a hierarchical structure that supports efficient searching for predictor blocks for a given target block. The hierarchical structure can comprise clusters of images at different levels of the hierarchy. In this embodiment, the exemplar dictionary 130 stores information describing the clusters including the level of the cluster in the hierarchy, a centroid of the cluster, features and/or dimensions of the representations of images. To this end, the dictionary builder module 230 includes a clustering module 240, sampling module 260, and dimension reduction module 250.

The clustering module 240 clusters the image blocks of images stored in the image store 270 based on similarity. For example, the clustering module 240 can use k-means clustering to cluster the image blocks into multiple distinct clusters. Examples of clustering methods used include spill-tree clustering that allows overlap of exemplars between clusters at the same level. In one embodiment, the clustering module 240 subdivides (partitions) the clusters into multiple sub-clusters using similar techniques. The clusters and sub-clusters collectively form a hierarchy, with the root node of the hierarchy representing the full set of image blocks, and successively lower levels of the hierarchy representing clusters and sub-clusters of the image blocks. The terms "cluster" and "sub-cluster" are used interchangeably herein since the only effective difference between these terms is the levels of the hierarchy at which they are represented. In one embodiment, the clustering module 240 analyzes the clusters at the lowest level of the hierarchy to determine whether these clusters should be further subdivided into smaller clusters. The criteria used to determine whether or not to further subdivide the clusters at the lowest level are called the leaf criteria.

In one embodiment, the clustering module 240 uses different information to perform the clustering of the image blocks at different levels of the hierarchy. In general, clustering at higher levels of hierarchy is performed based on less information on a per image block basis compared to clustering at lower levels of hierarchy. This technique allows for efficient hierarchical clustering and provides better results compared to using the same information irrespective of the level of hierarchy.

Using less information on a per image block basis is referred to herein as "filtering" the information. In an embodiment, information representing the image blocks is filtered by sampling the image blocks to obtain a smaller set of image blocks that can be clustered more efficiently. In another embodiment, the filtering is performed by representing the image blocks as feature vectors and reducing the dimensionality of the feature vectors. Other embodiments can perform both, the sampling of image blocks and dimension reduction of feature vectors to reduce the information processing used to perform the clustering.

The sampling module 260 performs filtering by sampling the image blocks to produce a subset of image blocks on which the clustering is performed. The sampling module 260 samples an input set of image blocks to obtain a subset of image blocks. The sampling of the input set of image blocks can be performed by randomly selecting image blocks from the input set. The sampling of images can utilize information from the images to determine a sample with uniform coverage of images with different characteristics in the input set. For example, metadata information from the images including video genre, image labels, time and location of capture of the image can be used to ensure that images with different metadata information are included in the sample. In an embodiment, the sampling module 260 uses the same sampling rate for all clusters at a given level of hierarchy of the clusters. Moreover, the sampling module 260 uses higher sampling rates for clustering at higher levels of the hierarchy than the rate used at lower levels of the hierarchy. This technique results in more filtering (i.e., clustering using less information) at levels of the hierarchy closer to the root node and less filtering at levels of the hierarchy farther from the root node.

If the sampling rate used by the sampling module 260 is below a particular threshold value, the resulting clustering may not be accurate. On the other hand, if the sampling rate is too high, the clustering process may not be efficient. Therefore, the sampling module 260 determines a sampling rate that results in accurate clustering without being highly computation intensive.

The sampling module 260 can determine a suitable sampling rate for clustering an input set of image blocks by comparing clustering results obtained from multiple sampling rates. In an embodiment, the sampling module 260 generates samples of an input set based on a low sampling rate. The sampling module 260 also generates samples of the input set using a higher sampling rate. The clustering module 240 performs clustering using the two different samples and compares the clusters obtained. If the clusters obtained from the two samples are determined to be similar, a sampling rate based on the lower sampling rate is selected. Alternatively, a sampling rate based on the higher sampling rate, or a sampling rate in between the two values can be selected. If the two sets of clusters are determined to be not similar to each other, the process is repeated by increasing the lower sampling rate. If the difference between the lower sampling rate and the higher sampling rate is below a threshold value, the process can be repeated by increasing both the lower sampling rate and the higher sampling rate.

Similarity between two sets of clusters can be measured by determining distances between corresponding clusters from the two sets. In an embodiment, a representative feature vector for each cluster called the centroid of the cluster is determined. For example, the centroid of a cluster can be determined as the average value of all the feature vectors of the cluster. The distance between two clusters is determined as the distance between the centroids of the two clusters. A distance between two sets of clusters is determined as an aggregate value based on distances between the centroids of corresponding clusters from the two sets. If the measure of distance between the two sets of clusters is within a threshold value, the two sets of clusters are considered similar.

The dimension reduction module 250 performs filtering by representing the image blocks being clustered as feature vectors having multiple dimensions. The dimension reduction module 250 transforms a feature vector representation of an image block to a feature vector representation based on fewer dimensions. The clustering module 240 then performs clustering uses the reduced-dimension vectors. The lower dimensional representation requires less computational resources to process. As a result, clustering a set of images represented using fewer dimensions performs better than clustering using a higher dimensional representation of the image blocks. Furthermore, clustering images represented using fewer dimensions can result in better quality of results since lower dimensional representations of images can eliminate noise present in higher dimensions of the images.

In one embodiment, the dimension reduction module 250 represents image blocks at higher levels of the hierarchy with feature vectors having less dimensions than it uses to represent image blocks at lower levels of the hierarchy. As with the sampling module 260, the technique used by the dimension reduction module 250 results in more filtering (i.e., clustering using less information) at levels of the hierarchy closer to the root node and less filtering at levels of the hierarchy farther from the root node.

The dimension reduction module 250 can select different features for representing images at different levels of the hierarchy. For example, the dimension reduction module 250 can use features that are simpler and easier to compute at higher levels of the hierarchy and features that are more complicated to compute at lower levels. A feature is considered easier to compute compared to another feature if it requires fewer instructions to compute, or less time to compute using similar computational resources, and/or it requires less storage space in the memory or secondary storage of a computing device. Examples of simpler features used at higher levels of hierarchy include color histogram and examples of complex features used at lower levels include texture oriented features. The dimension reduction module 250 can perform linear or non-linear transformations of the image block representations to reduce the dimensionality of the feature vectors. In an embodiment, the dimension reduction module 250 performs principal component analysis (PCA) to map higher dimensional feature vectors to lower dimensional feature vectors. PCA based dimension reduction attempts to maximize the variance of data in the low dimensional representation.

In an embodiment, clustering results obtained from two different feature vector representations are compared to determine a suitable feature vector representation for clustering the image blocks. For example, if the dimension reduction module 250 determines that the clustering results based on a lower dimensional representation of feature vectors are similar to clustering results obtained from a higher dimensional representation, a representation based on the lower dimensional representations is selected. The lower dimensional representation is selected since it requires less computational resources for processing compared to the higher dimensional representation even though both representations provide similar results. Since the higher dimensional representation requires more computational resources without providing significantly better results, there is no advantage of using the higher dimensional representation.

Building the Exemplar Dictionary

Figure 3:
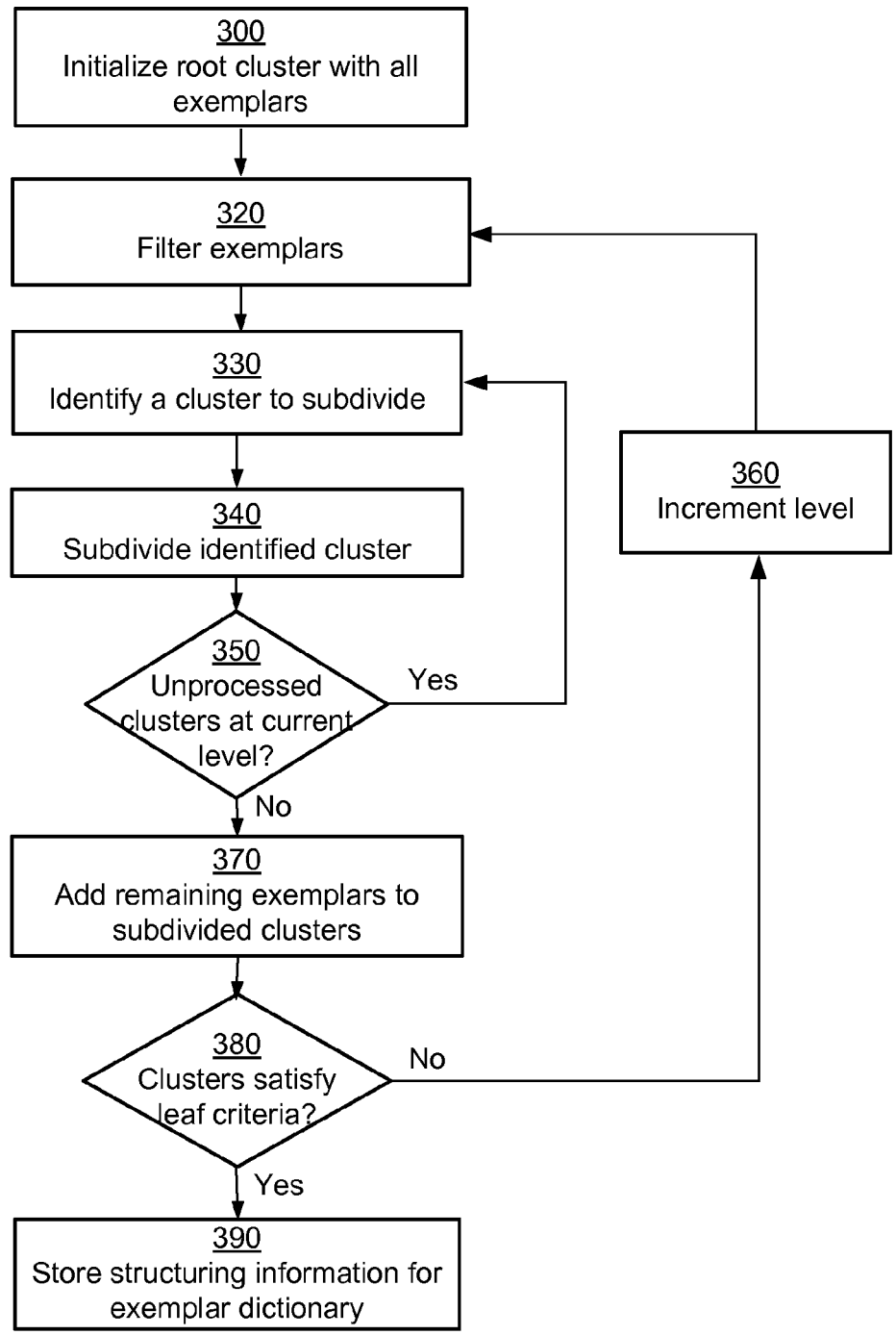
FIG. 3 is a flow diagram illustrating a process for building an exemplar dictionary according to one embodiment of the present invention.

FIG. 3 is a flow diagram illustrating a process for building an exemplar dictionary 130 according to one embodiment of the present invention. In one embodiment, the process is performed by the dictionary builder module 230 although other entities can perform some or all of the steps in other embodiments. Moreover, other embodiments can perform the steps in different orders and include different or additional steps.

The exemplar dictionary 130 is built by performing hierarchical clustering of a set of exemplar images from the image store 270 (called "exemplars" herein). The dictionary builder module 230 initializes 300 a root cluster to include all exemplars from the input set. The root cluster represents the highest level of the hierarchy. The dictionary builder module 230 subdivides the root cluster into smaller clusters using a clustering method, for example, k-means clustering. The clusters obtained by subdividing the root cluster may be further subdivided into smaller clusters.

The dictionary builder module 230 filters 320 exemplars in order to reduce the information used for clustering. In an embodiment, the dictionary builder module 230 filters exemplars by selecting a sample of the input set of exemplars. The sampling is performed by determining a sampling rate based on the level of hierarchy of the cluster being processed. The sampling rate for processing clusters at higher levels of hierarchy that are closer to the root level is lower than the sampling rate for processing clusters at lower levels of hierarchy. In another embodiment, the dictionary builder module 230 filters 320 exemplars by reducing the number of dimensions used in the feature vectors representation of the image blocks. The dictionary builder module 230 determines the number of dimensions of the feature vectors representing image blocks of a cluster based on the level of hierarchy corresponding to the cluster. The number of dimensions of feature vectors used for representing image blocks at higher levels of hierarchy is less than the number of dimensions of feature vectors used for representing image blocks at lower levels of hierarchy.

The dictionary builder module 230 identifies 330 a cluster and subdivides 340 (or partitions) the identified cluster into smaller clusters. If the dictionary builder module 230 determines 350 that there are unprocessed clusters at the current level, the dictionary builder module 230 identifies 330 an unprocessed cluster and subdivides 340 the identified cluster. The dictionary builder module 230 adds 370 the exemplars excluded during the filtering 320 process to the subdivided clusters. In an embodiment, dictionary builder module 230 adds 370 an exemplar to the subdivided cluster that has the closest centroid to the exemplar.

This process is repeated until the clusters at the lowest level satisfy 380 leaf criteria. The dictionary builder module 230 determines 380 whether the subdivided clusters meet the leaf criteria to determine whether the clusters at the lowest level need to be further subdivided. According to one leaf criterion, a leaf cluster is subdivided if the size of the leaf cluster exceeds a threshold value. The size of a cluster is measured by the number of exemplars belonging to the cluster. According to another leaf criterion, a leaf cluster is subdivided if the variations between the exemplars of the leaf cluster are determined to be above a threshold. The variations between exemplars of a cluster can be measured using a statistical measure of variance. Another leaf criterion uses the depth of the leaf clusters to determine whether to subdivide the leaf clusters. For example, if the depth of the leaf clusters is below a threshold value, the leaf clusters are further subdivided. Another leaf criterion determines whether to subdivide the leaf cluster or not based on changes to a leaf cluster when new exemplars are added to the leaf cluster. Exemplars that were excluded by the filtering step 320 are added to the leaf clusters. An exemplar is added to the leaf cluster comprising exemplars with the highest resemblance to the exemplar being added. For example, each cluster is represented by a centroid and the new exemplar is added to the leaf cluster with the closest centroid. The centroids of the leaf clusters are recomputed after adding some exemplars. If the centroids of the leaf cluster move significantly as a result of addition of the new exemplars, the leaf clusters are further subdivided. The movement of the centroids can be measured using an aggregate value based on distances moved by each centroid.

If the clustering module 240 determines that the clusters at the current level need to be further subdivided based on the leaf criteria, the clustering module 240 increments 360 the current level and repeats the above steps including filtering 320 exemplars, and subdividing 340 clusters at the current level. If clustering module 240 determines that the clusters at the current level do not have to be further subdivided, the clustering module 240 stores the information describing the clusters as part of the exemplar dictionary 130. In an embodiment, the clustering module 240 stores the information describing the clusters after various steps of the process described in FIG. 3, for example, after subdividing 340 an identified cluster.

Dictionary Based-Encoding and Decoding of Images

Figure 4:
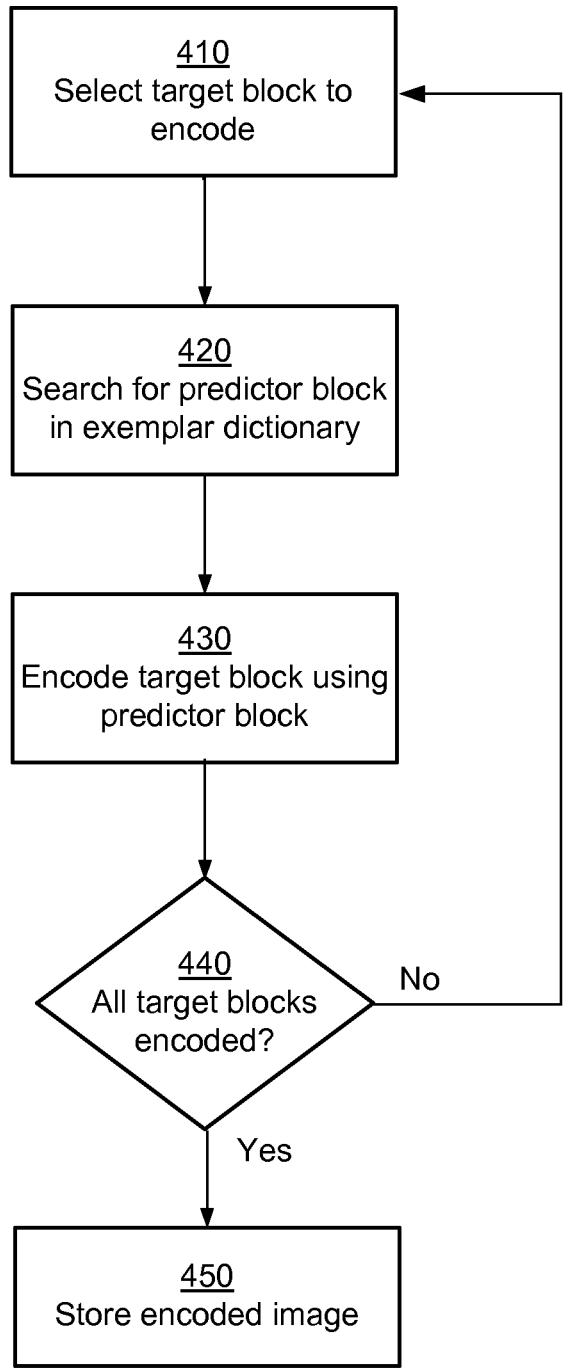
FIG. 4 is a flow diagram illustrating a process for encoding an image using an exemplar dictionary according to one embodiment of the present invention.

FIG. 4 is a flow diagram illustrating steps performed by an embodiment of the encoder module 135. Other embodiments can perform different and/or additional steps. Moreover, other embodiments can perform the steps in different orders. Further, the steps can be performed by entities other than the encoder module 135.

The encoder module 135 selects 410 a target block of an image 115 to encode. The encoder module 135 may select 410 the target block based on a scan-line order of traversal of the blocks of the image, a reverse scan-line order of traversal or any other order of traversal of the blocks of the image. The encoder module 135 searches for 420 a predictor block for encoding the selected target block from the exemplar dictionary 130.

The encoder module 135 searches 420 for a predictor block in the exemplar dictionary 130 based on a selection criteria that minimize cost functions for encoding the target block. For example, a selection criterion uses the exemplar that minimizes the amount of information used to identify the exemplar and the residual information representing a difference between the target block and the exemplar. Another selection criterion uses the exemplar from a leaf cluster that minimizes the distance between the target block and the exemplars of the leaf cluster. The encoder module 135 encodes 430 each target block using information used to identify the predictor block and residual information. The encoder module 135 checks 440 if there are more blocks to be encoded. The above steps of encoding including steps 410, 420, and 430 are repeated until all target blocks are encoded.

The encoder module 135 stores 450 the encoded image in the image store 270. In an embodiment, the target blocks of the image may be stored 450 before the processing of the next target block begins. The encoded image or the target blocks of the image may be transmitted to another computer system 110 over a network 170.

Searching for Predictors in the Exemplar Dictionary

Figure 5:
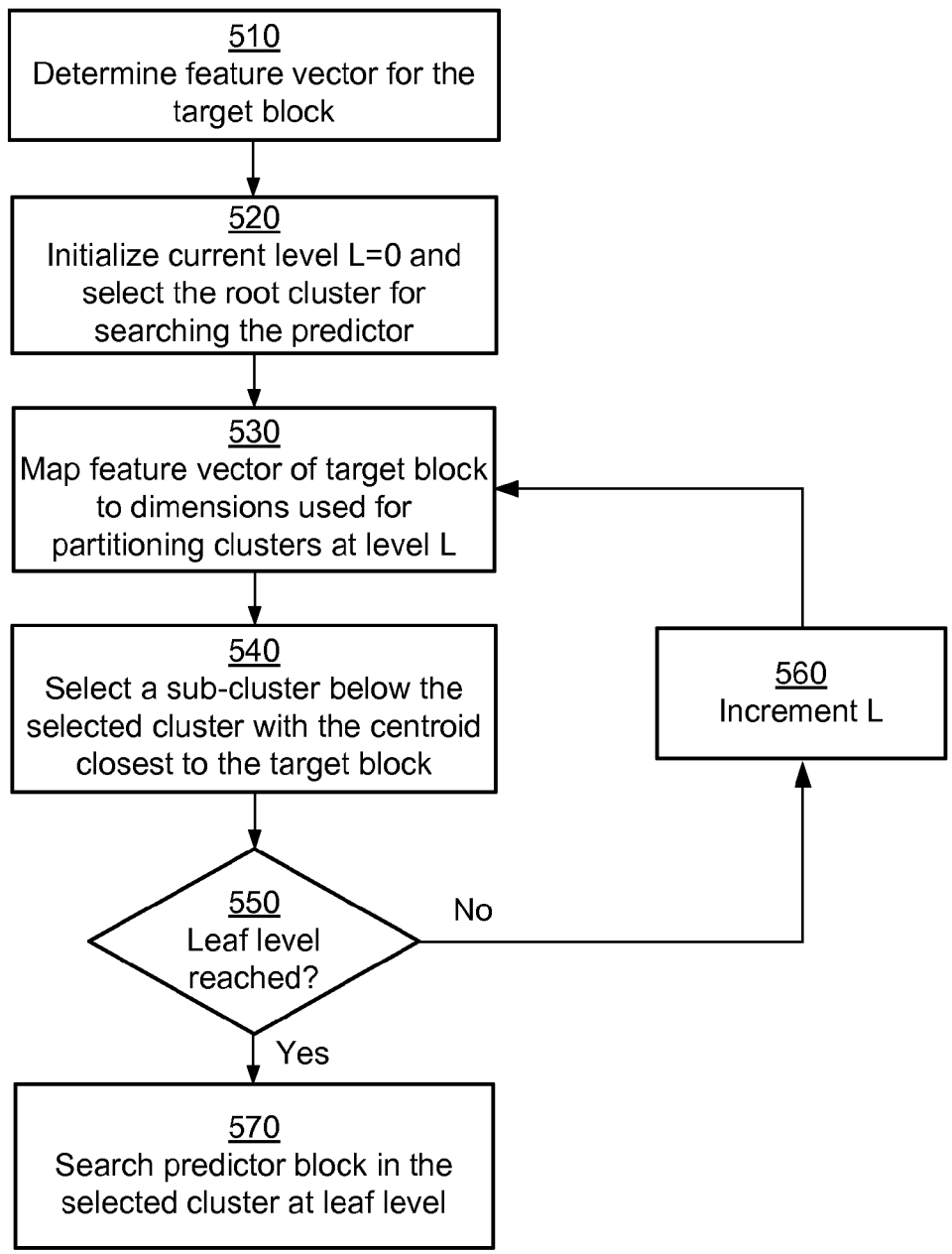
FIG. 5 is a flow diagram illustrating a process for searching for a predictor block in an exemplar dictionary for encoding an image according to one embodiment of the present invention.

FIG. 5 provides further details of the step of searching 420 for a predictor block in the exemplar dictionary 130 according to one embodiment of the present invention. The encoder module 135 encodes an image by encoding individual image blocks within the image. Each target image block is encoded using a predictor block that is determined to be similar to the target image block. The encoding of the target image block may also comprise residual information describing differences between the target image block and the predictor block.

The encoder module 135 generates 510 a feature vector for representing the target block being encoded. The encoder module 135 initializes 520 the current level L as zero corresponding to the root of the hierarchy and searches for the predictor block starting from the root cluster and traversing down the hierarchy of clusters.

The clusters at each level L are represented using a particular set of dimensions corresponding to the level L. The feature vector for the target block is mapped 530 to the set of dimensions corresponding to the level L. The encoder module 135 selects 540 the sub-cluster with the centroid closest to the feature vector of the target block as the sub-cluster containing the predictor block. The distance of the centroids of the sub-clusters with the target block is determined using a distance metric, for example, the L1 norm or the L2 norm.

The encoder module 135 checks 550 if the sub-cluster is at the leaf level. A cluster is at the leaf level if there are no sub-clusters below that cluster in the hierarchy. If the sub-cluster is not at a leaf level, the encoder module 135 increments 560 the value of level L, and repeats the steps of mapping 530 the feature vectors to dimensions associated with the current level L and selecting 540 a sub-cluster below the currently selected cluster. If the encoder module 135 determines 550 that the current sub-cluster is at the leaf level, the encoder module 135 searches 570 for the predictor block within the currently selected sub-cluster. The encoder module 135 encodes 430 the image block using the selected predictor block based on information identifying the selected predictor block in and/or residual information representing the image difference between the predictor block and the target block.

The encoder module 135 searches 570 for the predictor block in the leaf cluster, for example, by comparing the image block with each exemplar in the leaf cluster. In an embodiment, the encoder module 135 selects the exemplar that minimizes the distance between the image block and the exemplars as the predictor block. The distance between the exemplars and the image block can be measured using the L1 norm or the L2 norm. In an embodiment, the encoder module 135 searches 570 for the predictor block by selecting the block of the leaf cluster that minimizes the amount of information required for identifying the predictor block and the residual information between the predictor block and the image block being encoded.

In an embodiment, encoder module 135 selects a predictor block that is within a predetermined threshold distance of the image block being encoded. Alternatively, the encoder module 135 can select a predictor block that requires below a threshold amount of information for representing the predictor block and the residual. In these embodiments, the encoder module 135 can terminate the search as soon as an exemplar is found that meets the selection criteria without having to search through all the exemplars of the leaf cluster.

The decoder module 145 receives information identifying each predictor block in the exemplar dictionary 130. In an embodiment, the information identifying a predictor block comprises an identifier corresponding to the predictor block that is unique within the exemplar dictionary 130. The decoder module 145 locates the predictor block corresponding to each image block being decoded and retrieves the predictor block. If residual information is available in the encoding of the image block, the decoder module 145 combines the residual information with the predictor block to decode the image block. If no residual information is available in the encoding of the image block, the decoder module 145 uses the predictor block itself as the decoded image block.

Image Decoding

Figure 6:
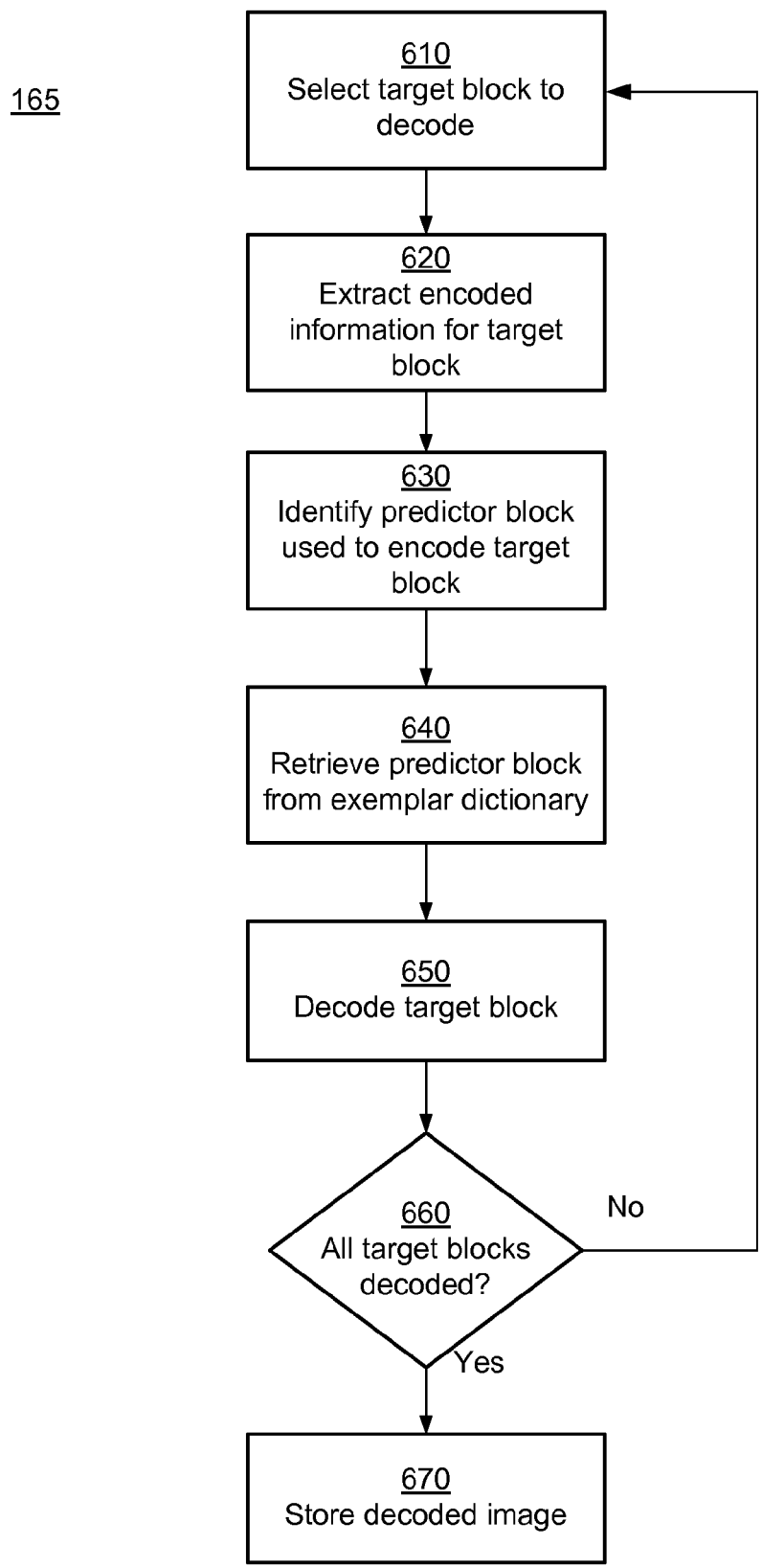
FIG. 6 is a flow diagram illustrating a process for decoding an image using an exemplar dictionary according to one embodiment of the present invention.

FIG. 6 is a flowchart illustrating steps performed by an embodiment of the decoder module 145 for decoding an image encoded by the encoder module 135. Other embodiments can perform different and/or additional steps. Moreover, other embodiments can perform the steps in different orders. Further, some or all of the steps can be performed by entities other than the decoder module 145.

The decoder module 145 selects 610 the next target block to decode. The decoder module 145 extracts 620 the information for the target block from within the encoded image. The extracted information comprises information identifying a predictor block used for encoding the target block and residual information describing the differences between the predictor block and the encoded target block.

The decoder module 145 identifies 630 the predictor block from the exemplar dictionary 130 and retrieves 640 the predictor block from the exemplar dictionary 130. The decoder module 145 decodes 650 the target block based on the predictor block and the residual information available in the encoded target block. The decoder module 145 checks 660 if all target blocks are decoded. If there are target blocks to be decoded, the decoder module 145 continues decoding the remaining target blocks. If there are no more target blocks to be decoded, the decoder module 145 stores 670 the decoded image in the image store 270. In an embodiment, the decoder module 145 stores 670 the decoded blocks in the image store 270 while subsequent blocks are being decoded.

Alternative Embodiments

The encoding methods described herein can be used for encoding digital content in general, for example, audio content, videos, images and the like. The clustering of image blocks can be performed in a top-down fashion or a bottom-up fashion. For example, a top down clustering of image blocks determines larger clusters of image blocks and then sub-divides the larger clusters to smaller sub-clusters. On the other hand, a bottom-up clustering of image blocks determines smaller clusters of image blocks and combines them into larger clusters.

In an embodiment, multiple instances of processes for clustering a set of images are performed in parallel, each process performing clustering using different parameters. For example, multiple instances of processes for clustering images based on different sampling rates may be executed in parallel. Alternatively, multiple instances of processes for clustering images based on different dimensions selected for feature vectors are executed in parallel. The results of the different instances of the clustering processes are compared based on certain criteria, for example, the distance that centroids of the clusters move when new images are added to the clusters. Based on the comparison, the results of a particular execution of the clustering process determined to be better than the other results is selected.

In an embodiment, each exemplar can itself be a dictionary storing image blocks. Organizing image blocks as a number of smaller dictionaries results in fewer images within each dictionary as compared to a single dictionary storing all the image blocks. As a result, clustering within each dictionary can be based on higher sampling rate compared to a sampling rate suitable for clustering a single large dictionary. For example, each exemplar can be a dictionary of image blocks belonging to a particular category of images, such as images of faces of people, images of trees, images of building and the like. In other embodiments, each exemplar can comprise a set of images, for example, a video cube.

In an embodiment, the image features represented at higher levels of the hierarchy are determined from larger portions of images compared to features represented at lower levels of the hierarchy. At higher levels of the hierarchy, a feature may be determined from an entire image, for example, a color histogram based on an entire image. Features at lower levels of the hierarchy may be determined from each individual image block. Features at other intermediate levels of the hierarchy may be determined from a portion of the image encompassing an image block that is larger than the image block.

The clustering module 240 generates a hierarchical organization of the dictionaries. The clustering of dictionaries into a hierarchical structure of dictionary clusters requires comparison between dictionaries. Comparison of one dictionary with another dictionary is performed using population measures describing the dictionaries. A population measure of a dictionary can comprise statistical metrics associated with the dictionary for example, mean values associated with images in the dictionary, covariance structures representing the images in the dictionary, histograms describing the population of the images in the dictionary and the like. The distance between two dictionaries can be measured using Kullback-Leibler divergence of distributions of image blocks within the dictionaries. These distance metrics are used for creating a hierarchical organization of dictionaries and for using the hierarchical organization for encoding images. In this embodiment, encoding an image comprises, selecting an appropriate dictionary for the image from the hierarchical organization of the dictionaries, followed by using the selected dictionary for encoding the image.

Computer Architecture

Figure 7:
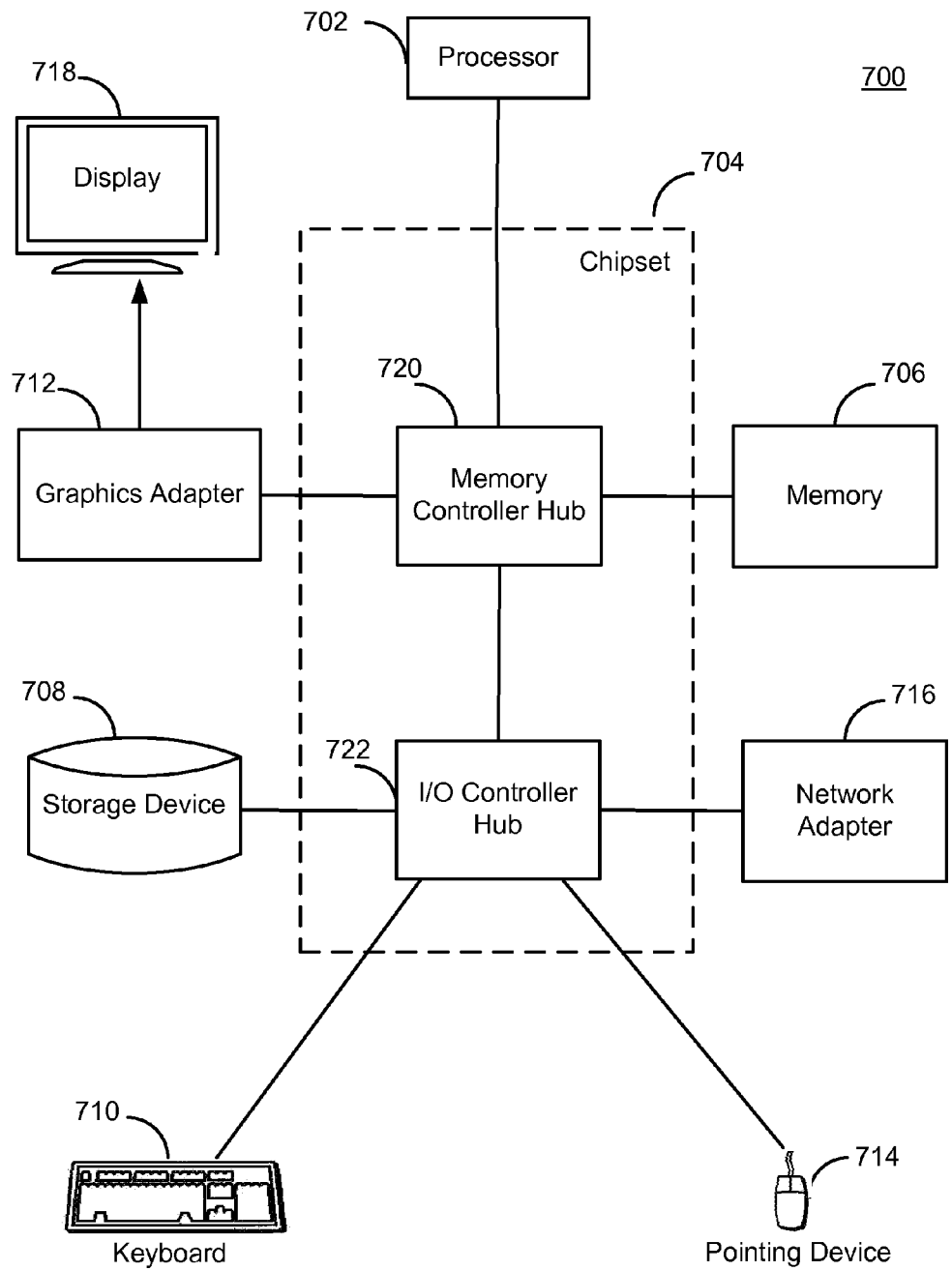
FIG. 7 is a high-level block diagram illustrating an example of a computer for use in the computing environment shown in FIG. 1 according to one embodiment of the present invention.

FIG. 7 is a high-level block diagram illustrating an example computer 700, such as a decoding system 110 shown in FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used as the computer systems of FIG. 1 can vary depending upon the embodiment and requirements. For example, the encoding system 105 used for encoding might include one or more blade computers lacking displays, keyboards, and/or other devices shown in FIG. 7. Likewise, the decoding system 110 used for decoding might comprise a mobile phone or other such device with a touch-sensitive display and limited processing power.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for building/using an exemplar dictionary for image compression. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for building an exemplar dictionary comprising exemplars for encoding images, the method comprising:
    identifying a set of exemplars, each exemplar comprising at least one image;
    performing hierarchical clustering of the set of exemplars to generate a plurality of clusters arranged as a hierarchy, the hierarchy comprising a high level and a low level, such that clusters at the high level are closer to a root of the hierarchy compared to clusters at the low level, the hierarchical clustering comprising:
        generating clusters at each level of the hierarchy, the generating comprising a filtering of exemplars such that the filtering performed at the high level generates less information per exemplar compared to the filtering performed at the low level; and
    storing an exemplar dictionary comprising information describing the hierarchy of clusters, wherein the exemplar dictionary is used to identify predictor blocks for encoding an image.

2. The method of claim 1, wherein the filtering comprises generating a sample subset of exemplars responsive to sampling the set of exemplars.

3. The method of claim 2, wherein the hierarchical clustering comprises:
    generating a set of clusters using the sample subset of exemplars;
    adding exemplars excluded from the sample subset to clusters of the set of clusters; and
    responsive to adding the exemplars excluded from the sample subset, subdividing clusters of the set of cluster to smaller clusters.

4. The method of claim 3, further comprising:
    determining whether to subdivide a cluster based on a movement of centroids of clusters caused by addition of the exemplars.

5. The method of claim 3, further comprising:
    determining whether to subdivide a cluster based on whether a level of the cluster in the hierarchy of clusters is below a threshold value.

6. The method of claim 3, further comprising:
    determining whether to subdivide a cluster based on whether a measure of variance of exemplars of the cluster exceeds a threshold value.

7. The method of claim 3, wherein adding exemplars excluded from the sample subset comprises:

selecting an exemplar excluded from the sampled subset;
determining a cluster from the set of cluster that is closest to the selected exemplar; and
adding the selected exemplar to a cluster that is closest to the selected exemplar.

8. The method of claim 2, wherein sampling the set of exemplars comprises:
generating a first set of clusters based on a first sampling rate;
generating a second set of clusters based on a second sampling rate that is higher than the first sampling rate; and
responsive to determining that the first set of clusters is similar to the second set of clusters, determining a sampling rate for sampling the set of exemplars based on the first sampling rate.

9. The method of claim 8, wherein the first set of clusters is determined to be similar to the second set of clusters if the centroids of the clusters of the first set are determined to be within a threshold aggregate distance from the centroids of the clusters of the second set.

10. The method of claim 1, wherein the filtering comprises generating a set of reduced dimension exemplars responsive to reducing dimensions of feature vectors representing the exemplars.

11. The method of claim 10, wherein reducing dimensions of feature vectors representing the exemplars comprises performing principal component analysis to select dimensions for the feature vector representation.

12. The method of claim 1, wherein exemplars at the high level of the hierarchy are represented using a first set of features and the exemplars at the low level of the hierarchy are represented using a second set of features such that the first set and the second set comprise different features.

13. The method of claim 1, wherein the exemplar dictionary is used to identify predictor blocks for decoding an image.

14. The method of claim 1, wherein each exemplar comprises a dictionary of images.

15. The method of claim 14, wherein the hierarchical clustering is performed by comparing exemplars based on population measures of sets of images represented by each exemplar.

16. A method performed by a computer for encoding an image using an exemplar dictionary, the method comprising:
selecting a target block from an image;
searching for a predictor block matching the target block in an exemplar dictionary, wherein the exemplar dictionary is organized as a hierarchy of clusters comprising multiple levels of hierarchy, each level of the hierarchy associated with a set of dimensions of features vectors, the searching comprising at each level:
representing the target block as a feature vector using the set of dimensions associated with the level;
determining a matching cluster at the level for the target block;
responsive to determining that the matching cluster is at a leaf level of the hierarchy, selecting an exemplar in the matching cluster that satisfies a selection criteria as the predictor block;
encoding the target block using the predictor block; and
storing an encoded image having the encoded target block.

17. The method of claim 16, wherein representing the target block as a feature vector comprises performing principal component analysis to determine dimensions of the feature vector.

18. The method of claim 16, wherein determining the matching cluster comprises selecting a cluster that has a centroid closest to the target block.

19. The method of claim 16, wherein the selection criteria comprise selecting an exemplar from the matching cluster with minimum distance from the target block.

20. The method of claim 16, wherein the selection criteria comprise selecting an exemplar from the matching cluster that is within a threshold distance of the target block.

21. The method of claim 16, wherein the selection criteria comprise selecting an exemplar from the matching cluster that minimizes an amount of information used to identify the predictor block.

22. The method of claim 16, wherein the selection criteria comprise identifying an exemplar within the matching cluster that minimizes a sum of an amount of information used to identify the predictor block and a residual information describing the difference between the predictor block and the target block.

23. A computer-implemented system for building an exemplar dictionary comprising exemplars for encoding images, the system comprising:
a computer processor; and
a computer-readable storage medium storing computer program modules configured to execute on the computer processor, the computer program modules comprising:
a dictionary builder module configured to identify a set of exemplars, each exemplar comprising at least one image;
a clustering module configured to perform hierarchical clustering of the set of exemplars to generate a plurality of clusters arranged as a hierarchy, the hierarchy comprising a high level and a low level, such that clusters at the high level are closer to a root of the hierarchy compared to clusters at the low level, the hierarchical clustering comprising:
generating clusters at each level of the hierarchy, the generating comprising a filtering of exemplars such that the filtering performed at the high level generates less information per exemplar compared to the filtering performed at the low level; and
the dictionary builder module, further configured to store an exemplar dictionary comprising information describing the hierarchy of clusters, wherein the exemplar dictionary is used to identify predictor blocks for encoding an image.

24. The computer implemented system of claim 23, further comprising a sampling module configured to perform filtering by generating a sample subset of exemplars responsive to sampling the set of exemplars.

25. The computer implemented system of claim 23, further comprising a dimension reduction module configured to perform filtering by generating a set of reduced dimension exemplars responsive to reducing dimensions of feature vectors representing the exemplars.

26. A computer program product having a non-transitory computer-readable storage medium storing computer-executable code for building an exemplar dictionary comprising exemplars for encoding images, the code comprising:
a dictionary builder module configured to identify a set of exemplars, each exemplar comprising at least one image;
a clustering module configured to perform hierarchical clustering of the set of exemplars to generate a plurality of clusters arranged as a hierarchy, the hierarchy comprising a high level and a low level, such that clusters at the high level are closer to a root of the hierarchy compared to clusters at the low level, the hierarchical clustering comprising:
 generating clusters at each level of the hierarchy, the generating comprising a filtering of exemplars such that the filtering performed at the high level generates less information per exemplar compared to the filtering performed at the low level; and
the dictionary builder module further configured to store an exemplar dictionary comprising information describing the hierarchy of clusters, wherein the exemplar dictionary is used to identify predictor blocks for encoding an image.

27. The computer program product of claim 26, further comprising a sampling module configured to perform filtering by generating a sample subset of exemplars responsive to sampling the set of exemplars.

28. The computer program product of claim 26, further comprising a dimension reduction module configured to perform filtering by generating a set of reduced dimension exemplars responsive to reducing dimensions of feature vectors representing the exemplars.

* * * * *